Feb. 9, 1960

C. LUDWIG 2,924,159

PHOTOGRAPHIC OBJECTIVE COMPRISING A SECTOR SHUTTER

Filed Aug. 20, 1956

Feb. 9, 1960 C. LUDWIG 2,924,159
PHOTOGRAPHIC OBJECTIVE COMPRISING A SECTOR SHUTTER
Filed Aug. 20, 1956 2 Sheets-Sheet 2

United States Patent Office 2,924,159
Patented Feb. 9, 1960

2,924,159

PHOTOGRAPHIC OBJECTIVE COMPRISING A SECTOR SHUTTER

Christian Ludwig, Oberkochen, Wuerttemberg, Germany, assignor to Carl Zeiss of Heidenheim a.d. Brenz, Wuerttemberg, Germany Application August 20, 1956, Serial No. 605,180

Claims priority, application Germany August 24, 1955

1 Claim. (Cl. 95—53)

The invention relates to a photographic objective comprising a sector shutter which is cocked and triggered by means of a communal actuating member. This actuating member is so constructed that it permits a rapid sequence and repetition of the cocking and triggering functions.

A special object of the invention is a photographic objective comprising a sector shutter arranged inside the objective mount, a rotatable actuating ring co-axially encircling the objective mount, said rotatable ring being provided with a projection which engages with a slot in the mount and whose edges are in contact with the trigger lever and the cocking lever of the sector shutter respectively, and two further rings which are also arranged co-axially with the objective. These two additional rings which may be arranged in front of or behind the actuating ring proper carry arms parallel with the axis which in turn carry one rod each that is in contact with one edge of the projection provided on the actuating ring. These two additional rings are coupled to each other by a spring connecting the two rods to each other.

A further object of the invention is an actuating ring which covers the slot provided in the objective mount in every position.

The projection on the actuating ring serving to operate the cocking and triggering lever of the sector shutter is dimensioned in such a way that the angle of rotation required for the cocking or releasing of the shutter is only a small one. By these means the invention permits a quick repetition of the cocking and triggering of the sector shutter.

One coupling of prior art of the cocking and triggering lever to a communal actuating lever has the disadvantage in comparison with the present invention that an angle of rotation is required for its operation which contains additionally the angle which in the arrangement according to the invention can be filled by the projection on the actuating ring. A further disadvantage of the arrangement of prior art consists in that a slot corresponding to the entire angle of rotation of the operating lever remains open while the actuating ring according to the invention covers this perfectly in every position.

A detailed explanation of the invention is given in the following in accordance with the drawing figures.

In the drawing—

Figure 1:
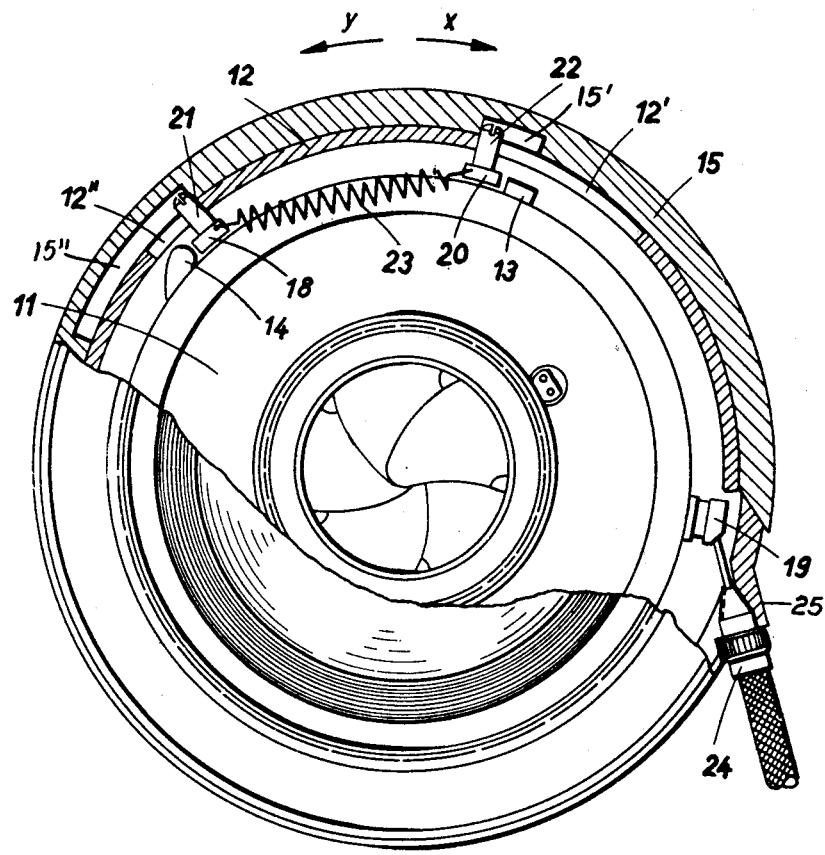
Fig. 1 shows a partial section through a photographic objective with a cocking and triggering device for a sector shutter arranged within the objective mount whereby means for the operation by a triggering pin e.g. by a cable release are provided.
Figure 2:
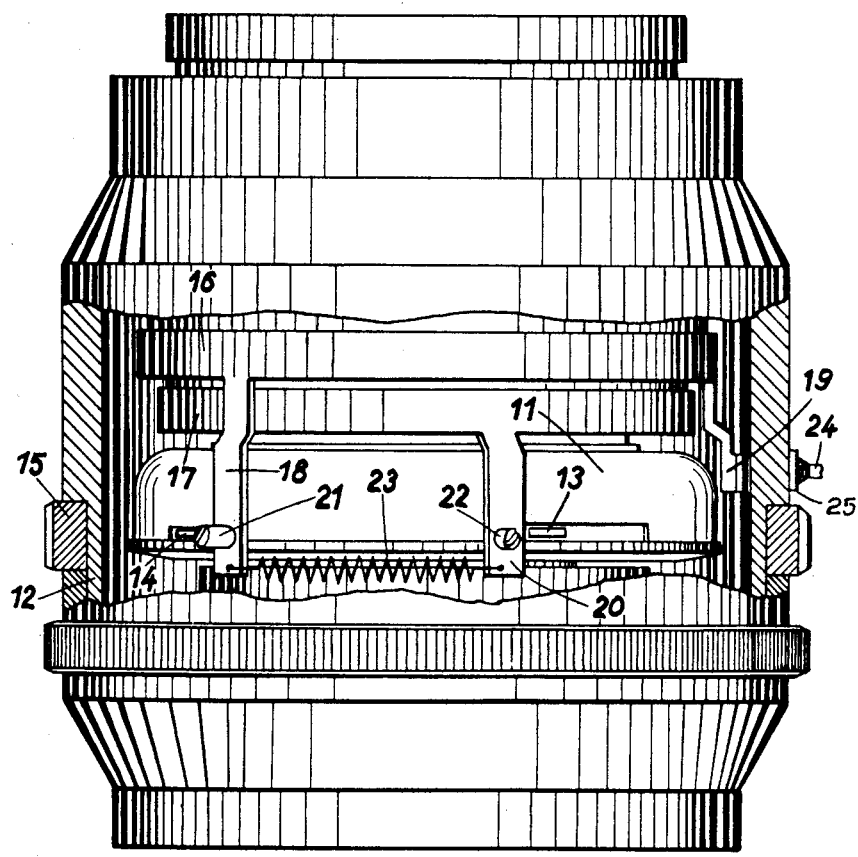
Fig. 2 shows a plan view from above of the objective represented in Fig. 1.

In Figs. 1 and 2 there is designated with 12 an objective mount containing a photographic objective and a sector shutter 11, which is provided with the cocking lever 13 and the triggering lever 14. The objective mount 12 is provided with two slots 12' and 12" and a rotatable actuating ring 15 encircling the mount coaxially and covering said two slots in the mount fully. The actuating ring 15 is provided at its inner periphery with two recesses 15' and 15" which are arranged above said two slits 12' and 12". Attached to the objective mount there is a release nipple 25 which is engaged by the movable part of a cable release 24.

Within and also coaxial with the objective mount 12 there are provided two additional rotatable rings 16 and 17. The first of these rings, i.e. the ring 17 is provided with a lever 20 which is directed parellel to the axis of the ring. The end of this lever is in contact with said cocking lever 13 of the sector shutter 11 and carries a pin 22 directed radially. The pin 22 passes through the slot 12' of the objective mount 12 and engages into the associated recess 15' in the actuating ring 15, there being in contact with the left edge of said recess.

The second of the two rotatable rings 16 and 17, i.e. the ring 16, is provided with two levers 18 and 19 which are also directed parallel to the axis of the rings. The end of the lever 19 is in contact with the movable part of said cable release 24 penetrating into the objective mount 12. The end of the lever 18 is in contact with said triggering lever 14 of the sector shutter 11 and carries a pin 21 directed radially. The pin 21 passes through the slot 12" of the objective mount 12 and engages into the associated recess 15" in the actuating ring 15, there being in contact with the right edge of said recess.

A spring 23 serves for connecting said two levers 18 and 20 to each other.

The mode of operation is as follows: Upon rotation of the ring 15 in the direction $x$ the pin 22 is taken along and thereby the lever 20 of the ring 17 makes contact with the cocking lever 13 so that the shutter is cocked. Upon a subsequent rotation of the ring 15 in the opposite direction $y$ the pin 21 is taken along whereby the lever 18 of the ring 16 makes contact with the triggering lever 14 so that the shutter is released. In this movement the pins 21 and 22 pass through the slots 12' and 12" in the objective mount 12. The ends of these two slots form simultaneously limits for the movements of the pins 21 and 22. In the cocking movement of the ring 15 in the direction $x$ first the pin 21 hits the right-hand end of the slot 12" and the spring 23 connecting the two levers 18 and 20 to each other is tensioned upon further movement of the ring 15 in the direction $x$. After releasing of the ring 15 the lever 20 with the pin 22 are pulled back into their original position. It requires therefore only a small angle of rotation in the direction $y$ to release the shutter. In the triggering movement of the ring 15 in the direction $y$ first the pin 22 comes into contact with the left-hand edge of the slot 12' and the spring 23 is again tensioned upon a further movement in the direction $y$. After triggering of the shutter and releasing of the ring 15 the lever 18 is pulled back into its position of rest by the tensioned spring 23.

The ring 16 is fitted with a further lever 19 directed parallel to the axis. With said lever 19 the movable part of a cable release 24 is in contact. After cocking of the shutter by rotation of the ring 15 in the direction $x$ the ring 16 with the lever 18 may be actuated by action of the cable release 24 upon the lever 19 and in this way the shutter may be triggered also by the triggering lever 14.

The embodiment represented is merely an example of design. Further embodiments are possible without exceeding the limits of the invention. More especially a ring sector may take the place of the complete actuating ring 15 and the cable release 24 may be replaced by a triggering pin.

I claim:

In a photographic objective which is arranged fully within a mount being provided with two slots a rotatable actuating ring encircling the objective mount coaxially and covering said two slots in the mount fully, said actuating ring being provided with two recesses at its inner periphery which are arranged above said two slots in the mount, a release nipple attached to said mount and engaged by a trigger penetrating into said mount, a sector shutter arranged within said mount and provided with a cocking lever and a triggering lever, two further rotatable rings arranged within said mount, the first of these rings being provided with a lever which is directed parallel to the axis of the rings, the end of this lever being in contact with said cocking lever of the sector shutter and carrying a pin directed radially, said pin passing through the first of said slots in said mount and engaging into the associated recess in the actuating ring, there being in contact with that edge of the recess which when turning the actuating ring in one direction is moved towards said cocking lever thus cocking said shutter, the second of said two rings being provided with two levers which are also directed parallel to the axis of the rings, the end of one of these levers being in contact with said trigger penetrating into said mount, while the end of the other lever is in contact with said triggering lever of the sector shutter and carries a pin directed radially, said pin passing through the second of said slots in said mount and engages into the associated recess in the actuating ring, there being in contact with that edge of the recess which when turning the actuating ring in the other direction is moved towards said triggering lever thus triggering said shutter, and a spring for connecting said two levers carrying said two pins to each other.

References Cited in the file of this patent

UNITED STATES PATENTS

| | | |
|---|---|---|
| 2,126,324 | Harmon et al. | Aug. 9, 1938 |
| 2,412,681 | Fuerst | Dec. 17, 1946 |

FOREIGN PATENTS

| | | |
|---|---|---|
| 876,504 | Germany | May 15, 1953 |